US007257409B2

(12) United States Patent
Chan et al.

(10) Patent No.: US 7,257,409 B2
(45) Date of Patent: Aug. 14, 2007

(54) CENTRALIZED CELL HOMING AND LOAD BALANCING IN A BASE STATION CONTROLLER

(75) Inventors: Mun-Choon Chan, Singapore (SG); Martin Havemann, Belford, NJ (US); Ramachandran Ramjee, Summit, NJ (US); Sandra R. Thuel, Middletown, NJ (US); Thomas Y. Woo, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 190 days.

(21) Appl. No.: 10/813,774

(22) Filed: Mar. 31, 2004

(65) Prior Publication Data

US 2005/0221839 A1    Oct. 6, 2005

(51) Int. Cl.
H04Q 7/20 (2006.01)
H04B 1/38 (2006.01)
H04M 1/00 (2006.01)
G01R 31/08 (2006.01)
G06F 11/00 (2006.01)

(52) U.S. Cl. .................. 455/453; 455/561; 455/452.1; 455/455; 370/230; 370/468

(58) Field of Classification Search ................ 455/560, 455/561, 450, 451, 452.1, 452.2, 453, 454, 455/455; 370/395.41, 230, 468; 709/244
See application file for complete search history.

(56) References Cited

U.S. PATENT DOCUMENTS

| | | | | |
|---|---|---|---|---|
| 4,974,256 A | * | 11/1990 | Cyr et al. ............... | 379/112.04 |
| 6,069,871 A | * | 5/2000 | Sharma et al. ............... | 370/209 |
| 6,314,293 B1 | * | 11/2001 | Servi et al. .................. | 455/450 |
| 6,314,301 B1 | * | 11/2001 | Dorenbosch et al. ....... | 455/519 |
| 6,385,449 B2 | * | 5/2002 | Eriksson et al. ............. | 455/436 |
| 6,553,227 B1 | * | 4/2003 | Ho et al. ..................... | 455/433 |
| 6,701,146 B2 | * | 3/2004 | Choi ........................... | 455/423 |
| 6,748,222 B1 | * | 6/2004 | Hashem et al. ............. | 455/453 |

(Continued)

FOREIGN PATENT DOCUMENTS

WO      WO 00/24163      4/2000

(Continued)

OTHER PUBLICATIONS

3rd Generation Partnership Project; Technical Specification Group Radio Access Network; 3G TS 25.413 V3.2.0; Copyright 2000; http://www.3gpp.org; http://www.soulinfo.com/~hugang/3gpp/specs/25413-320.pdf.*

*Primary Examiner*—Nay Maung
*Assistant Examiner*—Andrew Wendell

(57) ABSTRACT

A base station controller (BSC) of a radio or wireless telecommunications network base station includes a director. A BSC includes multiple central processing units (CPUs), with each CPU running a call-processing application for one or more connections. The director is a logical entity that intercepts wireless call-setup signaling and assigns each corresponding connection to a CPU according to a centralized load-balancing algorithm. The centralized load-balancing algorithm distributes connections to less loaded CPUs to i) prevent individual CPUs from overloading, ii) utilize otherwise unused system resources, and iii) increase overall system performance. The director hosts cell components that manage code division multiple access (CDMA) downlink spreading codes for a base station, providing centralized allocation of spreading codes by the base station.

12 Claims, 3 Drawing Sheets

U.S. PATENT DOCUMENTS

| | | | |
|---|---|---|---|
| 6,895,245 B2 * | 5/2005 | Wallentin | 455/436 |
| 6,975,879 B1 * | 12/2005 | Aalto et al. | 455/522 |
| 2002/0119784 A1 * | 8/2002 | Agin | 455/453 |
| 2002/0173315 A1 * | 11/2002 | Chmaytelli et al. | 455/453 |
| 2003/0072282 A1 * | 4/2003 | Liang | 370/335 |
| 2003/0125039 A1 * | 7/2003 | Lachter et al. | 455/453 |
| 2004/0214574 A1 * | 10/2004 | Eyuboglu et al. | 455/439 |
| 2005/0124347 A1 * | 6/2005 | Hosein | 455/446 |
| 2005/0176419 A1 * | 8/2005 | Triolo et al. | 455/423 |
| 2005/0176440 A1 * | 8/2005 | Sang et al. | 455/453 |
| 2005/0215265 A1 * | 9/2005 | Sharma | 455/453 |

FOREIGN PATENT DOCUMENTS

| | | |
|---|---|---|
| WO | WO 02/41646 A2 | 5/2002 |
| WO | WO 03/052985 A1 | 6/2003 |

* cited by examiner

CENTRALIZED CELL HOMING AND LOAD BALANCING IN A BASE STATION CONTROLLER

BACKGROUND OF THE INVENTION

1. Field of the Invention

The present invention relates to allocation of processing in a telecommunications network, and, more particularly, to allocation of connections to processors in a base station controller of a wireless network.

2. Description of the Related Art

Radio or wireless telecommunications networks provide wireless voice and data communication between different service providers, such as the public switched telephone network (PSTN) and the Internet. Typical networks deployed in the prior art operate in accordance with General Packet Radio Service (GPRS), Universal Mobile Telecommunications Systems (UMTS), and Code-Division Multiple Access (CDMA) 2000 network standards. A wireless network is typically characterized by one or more base stations (BSs), a radio network controller (RNC), a mobile switching center (MSC), and data gateway. Each BS manages at least one corresponding cell, or dedicated area of wireless radio coverage. The MSC serves as an interface to, for example, the PSTN network, while a data gateway serves as an interface to, for example, an IP network that connects to the Internet. Each base station communicates with user elements (UEs) through wireless radio signals. A user element is either a fixed or mobile transceiver, such as a mobile phone, wireless notebook computer, or fixed radio station.

The RNC includes a base station controller (BSC) and a traffic-processing unit (TPU). The TPU is employed for management of voice and data forwarding (traffic), while the BSC is employed for management of call control (signaling). The BSC connects the CDMA radio access network (RAN) with the core network (CN). Thus, the BSC manages i) the radio path and ii) signaling between each UE and the CN.

The BSC comprises multiple central processing units (CPUs) distributed over multiple blades (a blade is circuitry of predetermined functionality assigned to cells or cell sectors, such as equipment processor cards or units). Each CPU runs a call-processing application (software program) that, besides tasks such as soft-handover (mobility), outer-loop power control, measurement reports, and radio channel reconfiguration, guides the process of setting up and tearing down a user call. The call-processing application processes call-setup and call-release signaling messages, and the call-processing application also manages cell components. A cell component is a logical representation of circuitry and related processing that enables per sector per carrier coverage of a BS cell area (cells may be divided into sectors). For example, in CDMA networks, cell components manage spreading code trees for spreading code assignments to a cell/sector. Cell components employ downlink spreading codes used by BSs to set up downlink channels to UEs (e.g., mobile phones). In a soft-handover/soft-handoff situation, multiple BSs are connected simultaneously to the UE, where these BSs use spreading codes with the same spreading factor when communicating with this UE. Cell components of blades communicate with one another or are polled by a coordinating instance in order to determine free codes (i.e., available and unused) with the same spreading factor.

CPUs of a prior art BSC are associated with specific cells and call processing applications. Calls originating in a cell are generally handled by a call processing application running on the same CPU. Depending on the cell homing strategy (the configuration method of how to assign cell components to CPUs) of the BSC and user mobility patterns (the way users move through cells during active calls), some CPUs of the prior art BSC might become highly loaded, while other CPUs might be underutilized if a particular cell has a large number of voice and data calls. Cell homing strategies could be, but are not limited to, a random distribution so that all CPUs manage the same amount of Cell components, or a load biased distribution based on historical data so that heaviest loaded cells are not associated with the same CPU. The distributed cell homing strategy requires repeated traffic-load analysis to define an optimal cell placement because of changes in user mobility patterns, charging models, and new mobile applications.

Cell components generate CPU load whenever spreading codes are allocated or released. In a distributed system, the call processing application sends a code allocation/release request individually to all cell components holding a soft-handover leg of the processed UE. A voice call sets up a traffic connection right after the signaling connection is established. Both connections are torn down at voice call-release time. A data call also sets up both connections one after each other. However, after data session initialization, the data call immediately suspends the traffic connection if there is no data to be sent. This suspension state means that spreading codes are released, which is transparent to the data exchanging application on the UE. Only when a burst of data is to be sent new spreading codes are allocated and the traffic radio link is revived. When the data transmission is complete, the traffic connection (radio link) is again suspended. The bursty nature of data traffic causes a multitude of radio link setups and teardowns, which in turn triggers spreading code allocations and releases.

In addition, when a UE crosses a cell boundary, a new CPU, potentially located on a different blade, may serve the radio portion of the connection. However, the call-processing application CPU association, termed UE context, of the original CPU that served the UE's call-set-up request does not move except for exceptional conditions like switching the anchor/serving RNC, because it would be computationally very expensive to move all the call state information. Since the UE context does not move, messages are generated between the original and new CPUs, causing higher inter-CPU messaging overhead.

SUMMARY OF THE INVENTION

In accordance with exemplary embodiments of the present invention, a base station controller (BSC) of a radio or wireless telecommunications network includes a director. A BSC includes multiple central processing units (CPUs), with each CPU running a call-processing application for one or more connections. The director intercepts wireless call-setup signaling and assigns each corresponding connection to a CPU according to a centralized load-balancing algorithm. The centralized load-balancing algorithm distributes connections to less-loaded CPUs to i) prevent individual CPUs from overloading, ii) utilize otherwise unused system resources, and iii) increase overall system performance. The director hosts cell components that manage code division multiple access (CDMA) downlink spreading codes for a base station, providing centralized allocation of spreading codes for the call processing application. The call processing application sends a code allocation request to the director, which returns a set of codes for base stations currently connected to the UE.

In accordance with exemplary embodiments of the present invention, processing capacity of processors in a radio network controller is allocated by: 1) monitoring for a message of a connection between a user element and a network and 2) allocating, if the message is a call set-up message, one of the processors to the connection in accordance with a load-balancing algorithm, and, if the message is an allocation message, a set of spreading codes to the connection with the same spreading factor.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
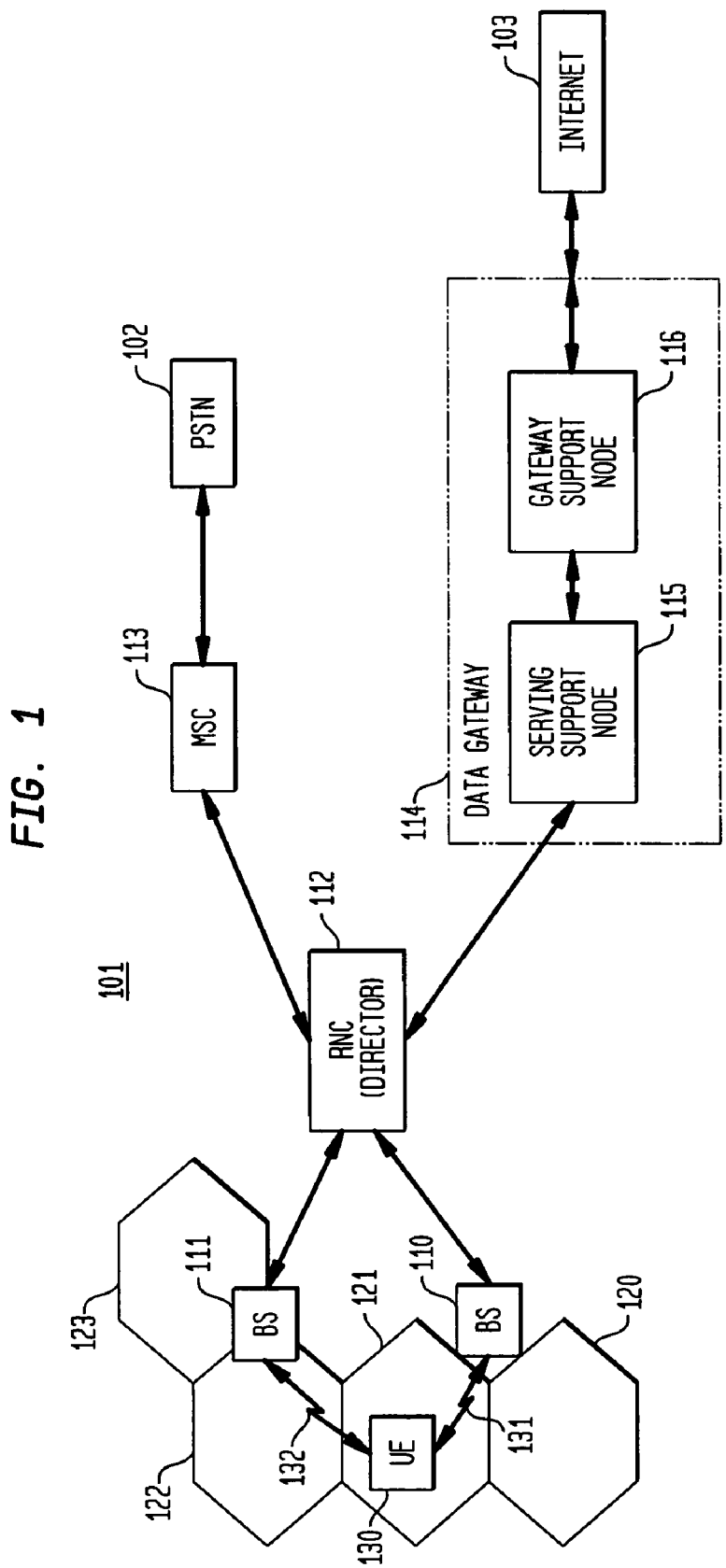
FIG. 1 shows a block diagram of communications network with centralized cell homing and load balancing in accordance with exemplary embodiments of the present invention.

FIG. 1 shows a block diagram of communications network 101 with centralized cell homing and load balancing in accordance with exemplary embodiments of the present invention. Network 101 might be employed to provide wireless voice and data communication between different service providers, shown as public switched telephone network (PSTN) 102 and Internet 103. Network 101 might operate in accordance with General Packet Radio Service (GPRS), Universal Mobile Telecommunications Systems (UMTS) network, and/or Code-Division, Multiple Access (CDMA) 2000 standards. Network 101 comprises at least two base stations (BSs) 110 and 111, radio network controller (RNC) 112, mobile switching center (MSC) 113, and data gateway 114.

RNC 112 includes a director operating in accordance with an exemplary embodiment of the present invention, as described subsequently. BS 110 provides wireless radio communication for cells 120 and 121, BS 111 provides wireless radio communication for cells 122 and 123, and data gateway 114 may comprise serving support node 115 and gateway support node 116. The data gateway manages user mobility, billing record collection, IP address allocation, etc. for the data calls. Each base station may communicate with user element (UE) 130 through wireless radio links 131 and 132.

Figure 2:
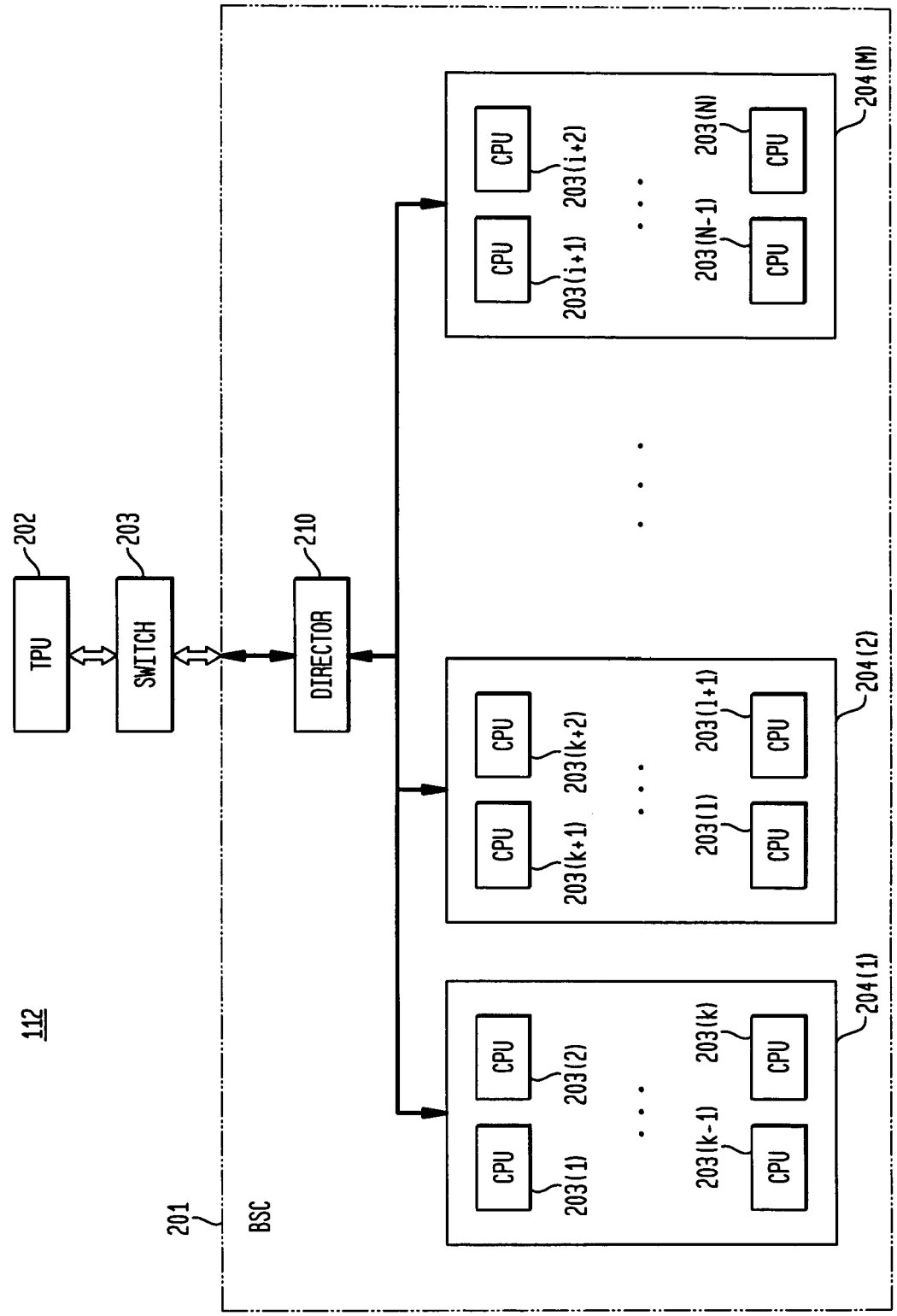
FIG. 2 shows an exemplary embodiment of the radio network controller of FIG. 1.

FIG. 2 shows an exemplary embodiment of RNC 112 having base station controller (BSC) 201, traffic processing unit (TPU) 202, and switch 203. BSC 201 includes director 210 operating in accordance with one or more exemplary embodiments of the present invention. TPU 202 is employed for management of voice and data forwarding, while BSC 201 is employed for management of call control (signaling). Switch 203 is a low-level component employed for connectivity to transfer signals between BSC 201 and TPU 202.

BSC 201 connects the CDMA radio access network (RAN) with the core network (CN). In FIG. 1, the RAN includes UE 130, BS 110, and BS 111, and the CN includes MSC 113 coupled to PSTN 102 and data gateway 114 coupled to an IP network 103. A provider's internal IP network typically connects the data gateway to the Internet through a firewall. BSC 201 coordinates operation of the radio paths and signaling between UE 130 and the CN.

Returning to FIG. 2, BSC 201 comprises multiple central processing units (CPUs) 203(1) through 203(N) distributed over multiple blades 204(1) through 204(M). Each of CPUs 203(1) through 203(N) runs an instance of a call-processing application that guides the process of setting up and tearing down a UE connection (or "call", though the connection may be voice, voiceband data, or packet data) with the CN.

A call-processing application running on a given one of CPUs 203(1) through 203(N) processes call-setup and call-release signaling messages. The call-processing application also manages cell components. A cell component enables per sector per carrier coverage of a BS cell area. Cell components employ downlink spreading codes used by BSs to set up downlink channels to UEs (e.g., mobile phones). In soft-handover/soft-handoff multiple BSs are connected simultaneously to the UE using spreading codes with the same spreading factor. Cell components communicate with director 210, which determines free codes with the same spreading factor.

In accordance with exemplary embodiments of the present invention, director 210 is a logical entity representing circuitry and related processing that monitors messages that are employed to setup a connection or relate to soft-handover/soft-handoff of the connection between cells/sectors. Director 210 intercepts wireless call-setup signaling and assigns the corresponding connection to one of the CPUs 203(1) through 203(N) according to a centralized load-balancing algorithm. The centralized load-balancing algorithm distributes connections to less-loaded CPUs to i) prevent individual CPUs from moving to an overload state, ii) utilize otherwise unused system resources, and iii) increase overall system performance. Once the call is assigned to a CPU, director 210 forwards all subsequent call related signaling messages to the CPU for processing by a call-processing application.

Director 210 also serves as a host to cell components that manage CDMA downlink spreading codes for BS 110. Director 210 provides centralized allocation of spreading codes for the call processing application running on CPU 203. Director 210 responds to allocation/release messages for spreading codes to establish/teardown radio links (e.g. soft-handover/soft-handoff, data bursts, voice call setup/release) and queries the corresponding cell components to determine an appropriate set of spreading codes with the same spreading factor. Once the set of spreading codes for soft-handover/soft-handoff of the connection is determined, director 210 returns the set of spreading codes to the corresponding querying call processing application running on CPU 203.

While director 210 is shown in FIG. 2 as a separate component of BSC 201, the present invention is not so limited. The director might be embodied in any of a number of components within the RNC, such as within a dedicated processor on a given blade, or as a function implemented in any one of the processors within the RNC that is coupled to the BSC.

Figure 3:
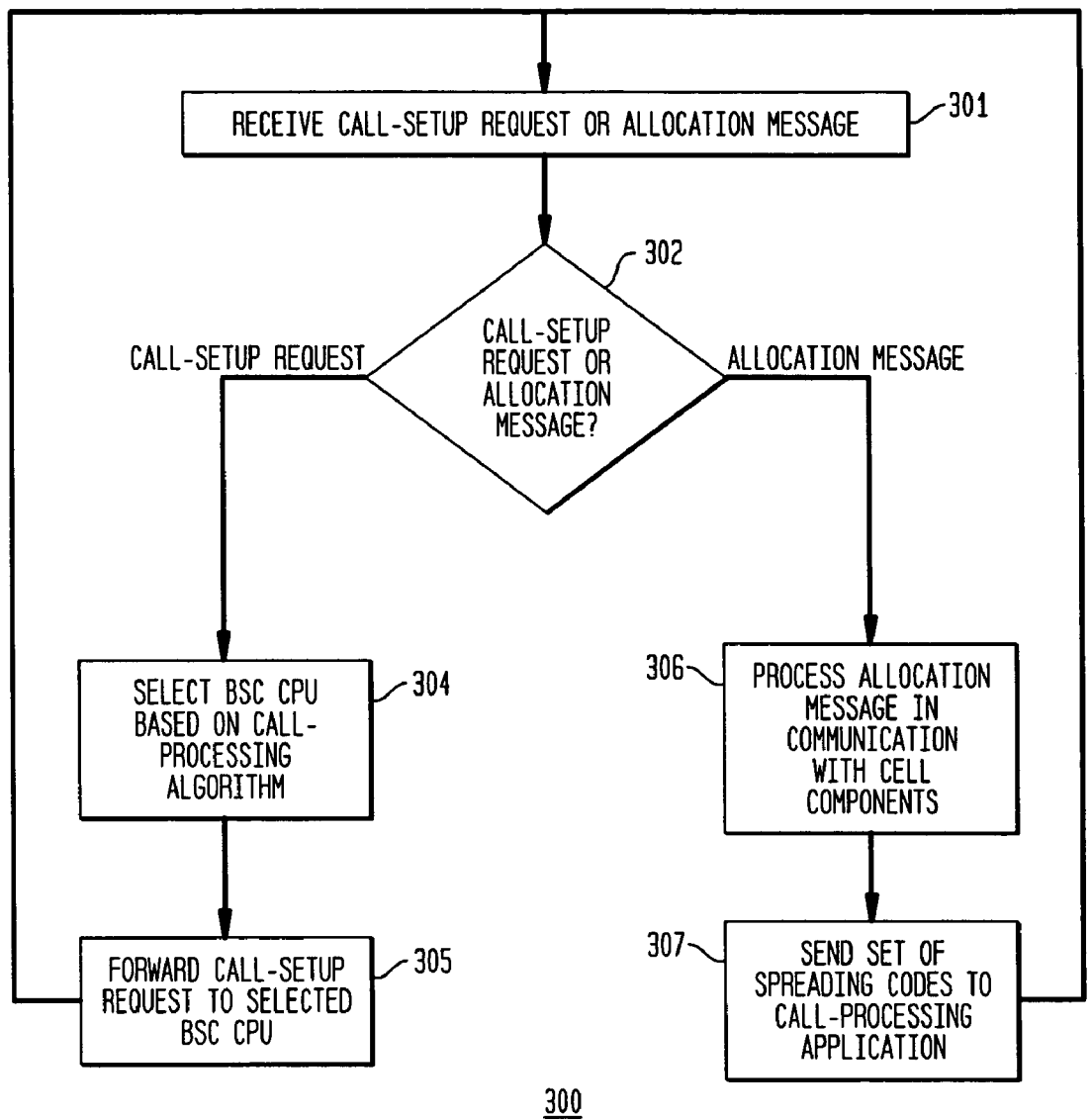
FIG. 3 shows an exemplary method employed by the director of FIG. 2.

FIG. 3 shows an exemplary method 300 employed by director 210 of FIG. 2. At step 301, the director receives a call-setup request or an allocation message. At step 302, a test determines whether a call-setup request or an allocation message was received. If the test of test 302 determines that a call-setup request was received, then the method advances to step 304. If the test of test 302 determines that an allocation message was received, then the method advances to step 306.

At step 304, the director selects a BSC CPU for call processing based on a predefined load-balancing algorithm. At step 305, the director forwards the call-setup request to the call-processing application running on the selected CPU. The call-processing application may then process the call-setup request. From step 305, the method returns to step 301.

At step 306, the director processes the allocation message. For downlink spreading code allocation, the director typically receives a single allocation message. The director queries the cell components to determine a set of spreading codes with the same spreading factor. The set of spreading codes depends on the number of soft-handover/soft-handoff legs. At step 307, the director sends the set of spreading codes with the same spreading factor to the call-processing application. From step 307, the method returns to step 301.

The director at step 304 might employ different load-balancing algorithms known in the art. For example, two load-balancing algorithms are as follows. The first load-balancing algorithm allocates based on the call-context amount per CPU, where the law of large numbers results in an averaging of the load imposed by individual users. This first load-balancing algorithm keeps track how many calls are currently processed on each blade (e.g., either by intercepting call-setup/call-release messages or by periodic polling of all CPUs/blades). The algorithm determines the average number of calls per CPU (=total calls/CPUs), and this average number is weighted by the total call capacity of the CPU. The CPU with the least weighted calls is then selected. Because the number of calls in the system is high (several thousand), the system load imposed by the calls averages out.

The second load-balancing algorithm balances based on CPU utilization weighted with the call processing capacity. Beyond a certain threshold of CPU utilization, a connection is redirected to the least-loaded CPU. Redirection continues until the CPU utilization sinks below the threshold or a close to overload threshold is reached. At this second threshold redirection is stopped and new calls begin to be dropped. Load-balancing algorithms might require a measure of CPU loading as an indicator of CPU utilization. Such measure might be, for example, a measure of the number of calls assigned to a CPU, a measure of the type (e.g., voice, data, or voiceband data) of connections processed by a CPU, or a measure of the processor utilization (amount of available processing capacity or "power") currently used by the CPU.

Centralized load balancing and cell homing in a BSC in accordance with one or more embodiments of the present invention may provide for the following advantages. Centralized information about system load enables use of optimized load-balancing algorithms. Such load-balancing algorithm might be optimized only for CPU utilization without considering varying message costs to cell components caused by a distributed cell homing strategy. For a connection in a soft-handover/soft-handoff state, negotiation of assigned spreading codes might be performed locally, which reduces inter-CPU overhead message traffic. Also, the present invention allows for lower operational costs since no historical traffic data analysis is required for connection and spreading-code assignments, reducing the complexity associated with adding new cells.

The present invention may be embodied in a processor, such as a network controller or computer, and the processor may be coupled to a network or network database to receive network topology, provisioning, and capacity information used by the methods as described herein. In addition, the present invention may be employed either for wired, wireless, optical, or non-optical networks, and may be employed for either synchronous or asynchronous networks.

As would be apparent to one skilled in the art, the various functions of the director may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

We claim:

1. A method of allocating processing capacity of processors in a radio network controller, the method comprising the steps of:
   (a) monitoring for a message of a connection between a user element and a network;
   (b) determining whether the message is (i) a call set-up message from the user element or (ii) an allocation message from one of the processors;
   (c1) if the message is a call set-up message, then allocating one of the processors to the connection in accordance with a load-balancing algorithm; and
   (c2) if the message is an allocation message, then allocating a set of spreading codes to the connection with the same spreading factor and sending the set of spreading codes to a call-processing application on the processor that sent the allocation message.

2. The method of claim 1, wherein step (c1) further comprises the step of providing, by the one of the processors, a call-processing application to the connection.

3. The method of claim 1, wherein step (c1) further comprises the step of measuring a utilization of each of the processors.

4. The method of claim 3, wherein step (c1) allocates the one of the processors based on a call-context amount per CPU load-balancing algorithm.

5. The method of claim 1, wherein step (c2) further comprises determining the set of spreading codes with the same spreading factor.

6. The method of claim 5, wherein, for step (c2), the set of spreading codes depends on the number of legs for soft-handover/soft-handoff of the connection.

7. The method of claim 1, wherein, for step (a), the message of the connection is of a network operating in accordance with at least one of a General Packet Radio Service (GPRS) standard, Universal Mobile Telecommunications Systems (UMTS) network standard, and a Code Division Multiple Access (CDMA) 2000 standard.

8. The method of claim 1, wherein the method is implemented in a processor of a radio network controller.

9. A network comprising a radio network controller (RNC), the RNC comprising:
- means for monitoring for a message of a connection between a user element and a network;
- means for determining whether the message is (i) a call set-up message from the user element or (ii) an allocation message from one of the processors;
- means for allocating one of the processors to the connection in accordance with a load balancing algorithm, if the message is an allocation message; and
- means for allocating a set of spreading codes to the connection with the same spreading factor and sending the set of spreading codes to a call-processing application on the processor that sent the allocation message, if the message is an allocation message.

10. A computer-readable medium having stored thereon a plurality of instructions, the plurality of instructions including instructions which, when executed by a computer, cause a processor to implement a method for allocating processing capacity of processors in a radio network controller, the method comprising the steps of:
- (a) monitoring for a message of a connection between a user element and a network;
- (b) determining whether the message is (i) a call set-up message from the user element or (ii) an allocation message from one of the processors;
- (c1) if the message is a call set-up message, then allocating one of the processors to the connection in accordance with a load-balancing algorithm; and
- (c2) if the message is an allocation message, then allocating a set of spreading codes to the connection with the same spreading factor and sending the set of spreading codes to a call-processing application on the processor that sent the allocation message.

11. The method of claim 4, wherein the call-context amount per CPU load-balancing algorithm comprises:
- determining an average number of calls per processor;
- weighting the average number of calls per processor by a total call capacity of the processor; and
- selecting the processor with the smallest weighted call average.

12. A method of allocating processing capacity of processors in a radio network controller, the method comprising the steps of:
- monitoring for a message of a connection between a user element and a network; and
- allocating, if the message is a call set-up message, one of the processors to the connection in accordance with a load-balancing algorithm based on a call-context amount per Cpu load-balancing algorithm, wherein the call-context amount per CPU load-balancing algorithm comprises:
  - determining an average number of calls per processor;
  - weighting the average number of calls per processor by a total call capacity of the processor; and
  - selecting the processor with the smallest weighted call average.

* * * * *